United States Patent
Eliav et al.

(10) Patent No.: US 7,486,413 B2
(45) Date of Patent: Feb. 3, 2009

(54) SYSTEM AND METHOD FOR DISPLAYING AN IMAGE

(75) Inventors: Dan Eliav, Zichron Yaakov (IL); Moshe Ben-Chorin, Rehovot (IL); Ilan Ben-David, Rosh Ha'ayin (IL)

(73) Assignee: Genoa Color Technologies Ltd., Herzliya (IL)

( * ) Notice: Subject to any disclaimer, the term of this patent is extended or adjusted under 35 U.S.C. 154(b) by 904 days.

(21) Appl. No.: 10/484,387

(22) PCT Filed: Jul. 18, 2002

(86) PCT No.: PCT/IL02/00594

§ 371 (c)(1), (2), (4) Date: Jan. 21, 2004

(87) PCT Pub. No.: WO03/010745

PCT Pub. Date: Feb. 6, 2003

(65) Prior Publication Data

US 2004/0201598 A1   Oct. 14, 2004

Related U.S. Application Data

(60) Provisional application No. 60/306,864, filed on Jul. 23, 2001.

(51) Int. Cl.
  *G06F 15/00* (2006.01)
  *G06K 1/00* (2006.01)
  *G06K 15/02* (2006.01)
(52) U.S. Cl. ............... 358/1.2; 358/3.21; 358/3.24; 358/505

(58) Field of Classification Search ............ 358/1.9, 358/3.01, 3.06, 3.2, 3.26, 504, 518
See application file for complete search history.

(56) References Cited

U.S. PATENT DOCUMENTS

| 4,390,893 A | 6/1983 | Russell et al. |
| 4,751,535 A | 6/1988 | Myers |
| 4,843,573 A | 6/1989 | Taylor et al. |
| 4,892,391 A | 1/1990 | Stewart et al. |

(Continued)

FOREIGN PATENT DOCUMENTS

EP    EP 0 537 887    10/1997

(Continued)

OTHER PUBLICATIONS

U.S. Appl. No. 09/710,895, filed Nov. 14, 2000, Ben David et al.

(Continued)

*Primary Examiner*—Edward L Coles
*Assistant Examiner*—James A Thompson
(74) *Attorney, Agent, or Firm*—Pearl Cohen Zedek Latzer, LLP

(57) ABSTRACT

A system (48) and an associate method for soft proofing image (69) before print, a system (48) comprise the image (69) being displayed at a desired scale and resolution (202) such that potential artifacts can be detected before the "hard copy" is printed. One non-limiting example of an artifact which can be detected with embodiments of the present invention is Moiré effects.

23 Claims, 9 Drawing Sheets

U.S. PATENT DOCUMENTS

| | | | |
|---|---|---|---|
| 4,985,853 A | | 1/1991 | Taylor et al. |
| 5,371,543 A | * | 12/1994 | Anderson .................. 348/270 |
| 5,416,890 A | | 5/1995 | Beretta |
| 5,455,600 A | | 10/1995 | Friedman et al. |
| 5,526,140 A | | 6/1996 | Rozzi |
| 5,592,188 A | | 1/1997 | Doherty et al. |
| 5,650,942 A | | 7/1997 | Granger |
| 5,863,125 A | | 1/1999 | Doany |
| 5,870,530 A | | 2/1999 | Balasubramanian |
| 5,892,891 A | | 4/1999 | Dalal et al. |
| 5,999,153 A | | 12/1999 | Lind et al. |
| 6,075,653 A | * | 6/2000 | Narimatsu et al. .......... 359/686 |
| 6,097,367 A | | 8/2000 | Kuriwakl et al. |
| 6,147,720 A | | 11/2000 | Guerinot et al. |
| 6,198,512 B1 | | 3/2001 | Harris |
| 6,220,710 B1 | | 4/2001 | Raj et al. |
| 6,246,396 B1 | | 6/2001 | Gibson et al. |
| 6,262,744 B1 | | 7/2001 | Carrein |
| 6,407,766 B1 | | 6/2002 | Ramanujan et al. |
| 6,522,425 B2 | * | 2/2003 | Yoshidome ................ 358/1.9 |
| 6,633,302 B1 | * | 10/2003 | Ohsawa et al. .............. 345/604 |

FOREIGN PATENT DOCUMENTS

| | | |
|---|---|---|
| JP | 2000253263 | 9/2000 |
| JP | 2000338950 | 12/2000 |
| WO | WO 95/10160 | 4/1995 |
| WO | WO 97/42770 | 11/1997 |
| WO | WO 99/10866 | 3/1999 |
| WO | WO 01/48551 | 7/2001 |
| WO | WO 01/95544 | 12/2001 |
| WO | WO 02/50763 | 6/2002 |

OTHER PUBLICATIONS

Ajito et al., "Multiprimary Color Display for Liquid Crystal Display Projectors Using Diffraction Granting", Optical Eng. 38(11) 1883-1888 (Nov. 1999).

Pointer, M. R., "The Gamut of Real Surface Colors", Color Research & Appl. 5(3): 145-155, 1980.

"A critical view of Spectral Models Applied to Binary Color Printing", Wyble and Berns, Color Research and Application, vol. 25, 2000, pp. 4-19.

Jeffrey A. Shimizu, "Scrolling Color LCOS for HDTV Rear Projection", SID 01 Digest, pp. 1072-1075.

Francisco H. Imai, Color Science; "Spectral reproduction from scene to hardcopy", Part 1-Multi-spectral acquisition ans spectral estimation using a Trichromatic Digital Camera System associated with absorbtion filters.

Rosen et al., " Spectral Reproduction from Scene to Hardcopy II", Image Processing. Munsell Color Science Laboratory, RIT-Proceedings of SPIE vol. 4300 (2001), pp. 33-41.

Gunter Wyszecki and W.S. Stiles, Color Science: Concepts and methods, Quantative Data Formula, 2d Ed., 1982, pp. 179-183.

Ajito et al., "Expanded Color Gamut Reproduced by Six-Primary Projection Display", Proc. SPIE, vol. 2954 (2000) pp. 130-137.

Keith Jack, Video Demystified, 3rd Edition, LLH Technology Publishing 2001 (pp. 215-219).

International Search Report from PCT/IL02/00594, mailed Dec. 13, 2002.

* cited by examiner

SYSTEM AND METHOD FOR DISPLAYING AN IMAGE

CROSS-REFERENCE TO RELATED APPLICATIONS

This application is a National Phase Application of PCT International Application No. PCT/IL02/00594, International Filing Date Jul. 18, 2002, claiming priority of U.S. Provisional Patent Application, No. 60/306,864, filed Jul. 23, 2001.

FIELD OF THE INVENTION

The present invention relates to the display of printed material on electronic monitors, more specifically to such display in an accurate manner.

BACKGROUND OF THE INVENTION

Section 1: Halftone Printing

Printing typically involves repetitive transfer of ink from a master onto a medium (e.g., paper, cardboard or other physical surface). For color reproduction, four types of inks are typically used, Cyan (C), Magenta (M), Yellow (Y) and Black (K), although of course other types of ink systems can also be used. Many applications, e.g books and other texts, use only black ink. Inks or dyes applied in printing behave as filters that pass only part of the light spectrum hitting the medium and inks. The light incident on the paper is spectrally filtered by the ink layer and reflected back by the medium towards the observer. Each of the primary inks blocks its complementary color, such that in the case of typical inks C passes the green and blue portions of the spectrum and blocks the red portion, M passes the red and blue portions and blocks the green portion and Y passes the red and green portions and blocks the blue portion. Black ink typically blocks the entire spectral range. Thus, upon reflection from the medium surface only part of the spectrum arrives to the eye of the viewer creating the sensation of a certain color. This method of color reproduction is termed subtractive color mixing. The term "subtractive" refers to the creation of color by removing a portion of the spectrum of light transmitted to the eye.

Printing methods are typically binary in nature, namely an ink layer of a uniform, unvarying thickness is either present or absent on the paper surface in certain areas; these areas may be termed "printing dots". Only two levels of the ink color exist: full ink or bare paper. This limits the amount of colors that can be presented by the inks and their overlaps, and furthermore does not allow for gradations. To obtain "gray levels" for each of the inks, halftone printing may be used. The paper is typically divided by a virtual grid into printing dots. The area of each printing dot is partially or fully covered with ink. The relative area covered by ink is known as the dot area or dot percentage (dot %).

In other print methods, e.g. ink-jet printing, the ink layer thickness is not binary. Nevertheless, the number of gradation levels may be rather limited and halftoning may be used to increase the effective number of levels, and to obtain smoother color transitions.

The blocking characteristics of the ink layer are measured by the ink density, which may be considered the negative logarithm of the transmission in the blocking region of the spectrum of the relevant ink. Higher ink density implies more saturated ink color. If the paper is only partially covered with ink, the apparent density is lower than the density of a solid ink layer, and the color is brighter and less saturated. For example, consider a cyan ink which passes the blue and green components of the spectrum and blocks the red component. The cyan solid ink density is the amount of the red component passing through a full coverage cyan layer. If there are small dots of cyan on paper, which are small enough to be below the eye resolution at typical reading distance, the paper has a pale cyan tint (a "gray level" or gradation of cyan). The apparent density of this tint is lower than that of a solid cyan layer because more of the red component of the white spectrum is received by the eye, since a large amount of the red component of the light is received from the uncovered areas of the paper (assuming a white paper medium). If the density of the tint area is defined in a similar manner as that of the density of the inks, there is a relationship between the tint density, the solid ink density, and the relative area of inked paper to the relative area of non-inked paper.

In practice, the halftone printing method is implemented with an imaginary square grid, dense enough so that the eye typically cannot perceive it from normal viewing distance, dividing the surface of the printing plate. Each elementary cell of this grid is meant to contain a printing dot. The grid reciprocal period (spatial frequency) is called a mesh or raster, and is typically in the range of 60-200 LPI (lines per inch), equivalent to 2.4-7.9 lines per millimeter (for commercial printing); other dimensions can be used. The apparent density is obtained by partial coverage of the area of the printing dot with ink. For the highest density all the area is covered with ink (100% dot area). For zero density the area is not covered by ink (0% dot area).

Each of the inks is layered according to its virtual grid. When examining the printed paper at the usual viewing distance, the impression of color is achieved. However, looking at the printed paper through a magnifying glass resolves a delicate arrangement of dots in the original primary colors, and overlap regions of colors. This can be seen in FIG. 1, showing a full scale sample image and a magnified region of that image, in which the dot structure is revealed. The elementary colors, seen through the magnifying glass, include the four inks CMYK, the three overlaps between two inks each typically producing Red (overlap of M and Y), Green (overlap of C and Y) and Blue (overlap of C and M), and the white color of the typical paper medium. Overlap of CMY produces a black color, and any overlap of C, M or Y with black also produces black (K). In practice, pure black may not be produced by CMY alone for various reasons, but in most cases CMY can be treated as black. Thus, the total effective number of elementary colors is seven, CMY RGB and white/black (white/black is the same color at different brightness levels). Since the CMY RGB and white/black dots are typically not discernible to an unaided eye at the intended difference, the eye integrates (additively) the light reflected back from these colors, creating the sensation of color. Halftone printing may also be used to produce images having only black and white (and shades of gray).

Section 2: Screen and the Moiré Effect

The screening process converts the original image density to printing dot shape and size. In recent years screening has been performed digitally. The apparent densities of the image picture elements (pets) are stored (in terms of dot area) in a digital file containing, for example, CMYK data. Of course, the screening process, and the halftone printing process, may be used with files having other color formats, and with files representing black and white images. Typical tone-depth is 8 bit/separation, representing 256 "gray" levels, although other data formats may be used. A value of zero corresponds to zero coverage of the relevant ink, while a value of 255 corresponds to a full coverage of the relevant ink in the printing dot. The screening process transforms those 256 levels into a bi-level format (one bit data) representing a large number of covered/uncovered spots which are portions of the printing dot. Each printing dot is projected on a matrix of higher resolution than the resolution of the printing dots (determined by the resolution of the plate setter, typically 100 spots/mm), and the spots of this higher density matrix are set on or off according to the required apparent density. Thus each printing dot in the mesh of printing dots is itself represented by a higher density matrix of spots. This is shown in FIG. 2, depicting two sample circular dots of different areas created by exposing certain spots inside an area representing a printing dot. The screened file is a raster bitmap (two-level data) of the image data file after it has been converted according to the procedure described above, where each bit corresponds to the on/off condition of a spot. One screened file may exist for each dye; alternately the data may be combined into one file.

The binary screened file is exposed on the CMYK plates. As a result of the screening process each plate is a periodic grid of printing dots, with a periodicity determined by the mesh. Each printing dot is formed by spots. During printing, plates are impressed on paper, and one or more grids (of the different separations/inks) are laid one on top of another.

If the overlap of more than one grid is not perfect a Moiré pattern may appear. A Moiré pattern is an artificial periodic structure visible to the naked eye, which is created by the interference of two or more periodic patterns, as shown in FIG. 5. The Moiré pattern is a periodic structure of darker and brighter regions (the brighter regions of the Moiré pattern are marked by arrows in FIG. 5) that are clearly visible by the observer. If a Moiré pattern appears in a reproduction (e.g., printed or other material) based on an original image, the viewer at the appropriate distance may see a pattern in the reproduction that does not exist in the original. To minimize these patterns, the multiple grids may be placed at certain angles, for example having 30° between each pair of separations. However, full elimination of the Moiré effect may not be possible, since in one implementation there are a certain number (for example four) separations and only 90° to spread them. As a result, one of the separations, usually yellow, may be placed at 15° with respect to other separation, giving rise to a pattern in certain colors. Other factors may cause Moiré effects. Another source of Moiré patterns can result from interference between the screen of the printing dot and a periodic pattern existing in the image (e.g., a striped shirt or other regular pattern) or other artifacts on the image. Other visible artifacts may appear in a reproduction that are not in the original image; for example blocking, overexposure, or rosettes.

Section 3: Proofing of Printed Material on Electronic Devices

Proofing involves the creation of an accurate apparent match between an original representation of an image (for example, a photograph) and a reproduction of the image (for example, a halftone printed version of the photograph meant for mass distribution). Originals may be, for example, pictorial slides, which are analog in nature; however other types of originals may be proofed. Originals typically have a very high spatial resolution, and therefore can typically be considered continuous. Furthermore, their density gradation varies also continuously. In the age of digital information most of the reproduction process is done digitally. The original is scanned to obtain a file containing the color data (when color images are considered). For example, a typical scanning may result in a file containing RGB values. The file is typically converted to CMYK separations, and plates are created, which are installed on a press for print. To obtain color consistency, proofs are produced and examined in various stages of the process, to assure that each step is color consistent with its previous step. In many cases, a proof representing the halftone print is also prepared, to check for errors in the screening process, or to examine for interference between the screen spatial frequencies and periodic structures in the image, that might result in Moiré or other artifacts.

Proofing usually includes printing a "hard proof" on paper (or other substrate) using the same films that are later used for plate making for printing the final version of the physical material. This paper "hard proof" is sent to the customer and/or designer for approval. If a Moiré pattern or other defect is detected manually (by visual inspection with a naked eye), films are prepared again and the process is repeated. In many cases such a screening proof is not made, and such an error is detected only on the final prints, resulting in a major loss of time and increased cost.

This manual procedure limits the advantages of digital workflow. The need for an accurate digital "soft proof" on an electronic display is clear.

Currently available soft proofing devices enable designers and pre-press personnel to view the works on a computational device such as a personal computer or workstation displays (usually based on Cathode Ray Tubes, or CRTs), while the final product is a printed image on paper. However, these background art devices do not overcome inherent deficiencies for digital print proofing, and in particular cannot accurately replicate, and hence enable the designer and pre-press personnel to detect, such defects and artifacts as Moiré patterns.

As previously described, Moiré patterns of certain periodicity are highly visible and disturb the image perception. They are difficult to predict, since they involve the human perception of low-frequency beats resulting from interference of the screen spatial frequencies (sometimes with the image spatial frequencies). Even if the different beat frequencies might be predicted, their visibility depends on the perception of the eye, which is influenced by the color, brightness, and the surroundings. In practice, Moiré patterns are detected by analog simulation of the print process involving the creation of an image on paper in a similar manner to printing. This "hard" screening-proof method is currently cumbersome, time consuming, inefficient and expensive. A soft proof of screening on an electronic digital display would allow better connectivity to the digital workflow, which is increasingly penetrating the printing industry. However, an effective method for soft screen proofing is not yet available.

Conventional display devices based on cathode ray tubes, plasma screens, or liquid crystal flat panel devices cannot reproduce the details of a print image sufficiently such that print effects are visible to human viewers. One reason is that the size of the pixels is fixed and is relatively large compared to the printing dots and spots of the print process. Furthermore, to present color, each pixel may be combined from a set of red, green and blue sub-pixels. Color is achieved by integration of light coming from neighboring sub-pixels. The display sub-pixel grid cannot typically reproduce the overlapping effect of the grids of the different separations (of CMYK inks), since color presentation in these devices is inconsistent with halftone presentation.

Therefore, there is an unmet need for a device, system and a method for accurate electronic display of an image to be printed in order to provide soft proofing of an image before being printed, particularly for detection of potential artifacts.

SUMMARY OF THE INVENTION

An embodiment of the present invention provides a device, system and a method for soft proofing of an image, such as a halftone image, before it is printed onto printed material, such that the image is displayed to the user proofing the image at a desired scale and resolution, and such that potential artifacts can be detected before the "hard copy" is printed. Artifacts which can be detected with an embodiment of the present invention are, for example, Moiré effects. The image is typically presented correctly scaled without significant distortion. Certain embodiments utilize a digital projection display.

One embodiment of the present invention provides a device, system and a method for soft proofing an image before it is printed onto printed material, such that the image is displayed to the user proofing the image at the desired scale and resolution, and such that potential artifacts can be detected before the "hard copy" is printed. One non-limiting example of an artifact which can be reproduced and detected with embodiments of the present invention is Moiré effects. Various embodiments of the system and method of the present invention may be used with displays having a set of conventional primaries (e.g., three primaries), and in addition with displays using other primary colors. Embodiments of the system and method of the present invention may be used to proof black and white images, and may include displays not displaying color and displaying only black and white (and possibly gray).

According to embodiments of the present invention, provided herein is a method for soft proofing of an image before being printed onto printed material, comprising the steps of: (a) providing a display device for displaying the image; and (b) adjusting scale and resolution of the image for display on the display device to detect a potential artifact before the image is printed on the printed material.

One embodiment to the present invention is a method for displaying an image comprising: (a) providing a display device for displaying the image; and (b) adjusting scale and resolution of the image for display on the display device so that the provided image may display existing artifacts before the image is printed on the printed material. In a further embodiment the potential artifact is a Moiré effect.

In a further embodiment, the image is provided in an image file comprising a plurality of bits, and step (b) further comprises: (i) determining a scaling ratio for scaling the plurality of bits according to a resolution of the printed material; (ii) calculating a number of bits to be read from the file according to a display area of the display device and the scaling ratio; (iii) loading the number of bits to the display device; and (iv) adjusting the optical zoom according to the resolution.

The display device may comprise, for example, a projection-based display device. In further embodiments, the projection-based display device comprises: (i) a light source for producing light of at least four primary colors; (ii) a converter for converting the image data to at least one of the at least four primary colors according to at least one characteristic of the printed material to form converted data; (iii) a controller for determining a combination of at least one of the at least four primary colors according to the converted data for production by the light source; (iv) a projector for projecting light of the at least four primary colors according to the combination; and (v) a viewing screen for displaying the projected light. The light source may comprise, for example: (1) a polychromatic source; and (2) at least four color filters, each color filter corresponding to a primary color for filtering polychromatic light from the polychromatic source to produce light of the at least four primary colors. The projector may further comprise a pixilation device such as a spatial light modulator for determining a path of light of each primary color. The projector may spatially alter a path of light of each primary color for projection onto the viewing screen. The projector may determine projection of light of each primary color according to a temporal sequence.

In further embodiments, the projection-based display device comprises: (i) a light source; (ii) a projector for projecting light of one or more primary colors according to input data (which may or may not need conversion); and (iii) a viewing screen. Such a display may be monochrome or may include multiple primaries. The display device may further comprise, for example, a converter for converting input image data to a set of primary colors according to at least one characteristic of the printed material to form converted data; a controller for determining a combination of at least one of the primary colors according to the converted data for production by the light source; a projector for projecting light of the at primary colors according to the combination; and a viewing screen for displaying the projected light.

In a further embodiment, the light source further comprises: (3) a color wheel for holding the color filters; and (4) a motor for rotating the color wheel.

In a further embodiment, pixilation device is selected from the group consisting of a binary modulation type and a continuous modulation type.

The pixilation device may be, for example, a DMD, FLC, quantum well modulator, electro-optical modulator, LCD, electro-optical modulator or magneto-optical modulator. Other suitable pixilation device may be used.

BRIEF DESCRIPTION OF THE DRAWINGS

The invention is herein described, by way of example only, with reference to the accompanying drawings, wherein.

DETAILED DESCRIPTION OF THE INVENTION

Figure 1:
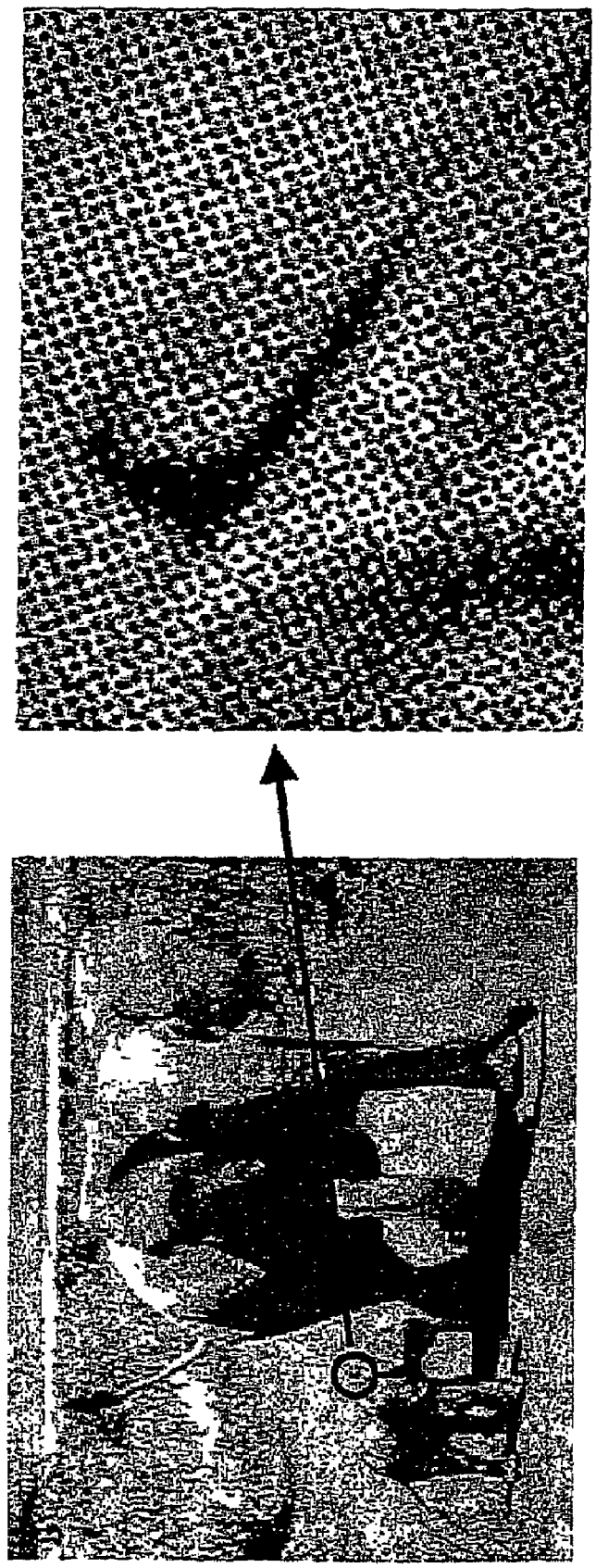
FIG. 1 shows a full scale sample image and a magnified region of that image, in which the dot structure is revealed.
Figure 2:
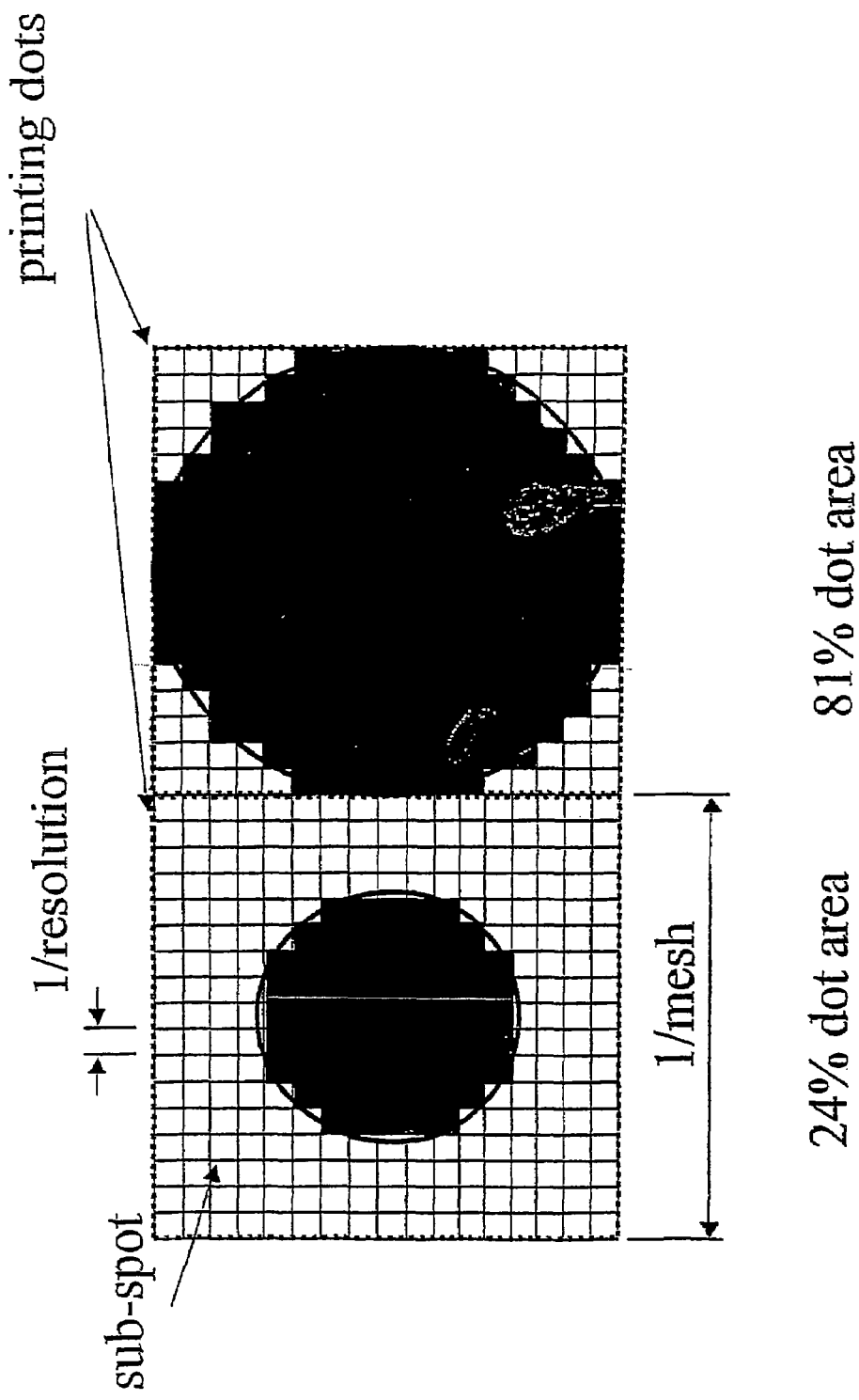
FIG. 2 depicts two sample circular dots of different areas created by exposing certain spots inside an area representing a printing dot.

Various aspects of the present invention are described herein. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

For print proofing allowing for human perception of certain print effects, an accurate representation of the screened image should be presented, which is as similar as possible to the appearance of the image when printed as a "hard copy" onto paper or other physical medium. It is desirable but not necessary that the electronically displayed image should have the same length scale as the printed image (in the sense that, e.g., 1 cm or 1 inch on the printed image in any direction is translated to 1 cm or 1 inch in the displayed image), such that the physical dimensions of the original are substantially identical (wherein substantially identical includes identical) to the physical dimensions of the image on the monitor. The appearance to the user of the scale of the mesh and the total size of the image should therefore be substantially identical for both the printed and electronically displayed versions of the image. Furthermore, it is desirable (but not necessary) that the resolution of the displayed and printed image is the same. By having both resolution and length scale of the displayed and printed images the same or similar, we ensure that the "geometrical" effects are substantially identical.

Since the angles of the different grids and their meshes are parameters of the screen process, and the screened bitmap file is a digital representation of the screened image, the simplest way to present a screened image file on a display is to map each bit (representing a spot in the printed image) from the file to a respective pixel on the display. Then, if the size of a pixel is identical to the size of a spot in the printing image, both resolution and length scale of the displayed image are identical to that of the printed image.

However, there are two problems with such an overly simplistic approach, associated with the structure of common electronic display devices. Display devices based on cathode ray tubes, plasma screens, or liquid crystal flat panel devices typically have a fixed pixilation at the hardware level of the display screen itself. The size of the pixels is fixed and is relatively large compared to the printing dots and spots of the print process. Since the resolution of the display device is determined by the hardware, a bit-to-pixel transformation does not preserve the image size. Furthermore, in color displays, each pixel is typically combined from a set of colored sub-pixels. The display sub-pixel grid cannot typically reproduce the overlapping effect of the grids of the different separations.

Electronic "scaling", which is common in image processing algorithms for electronically displaying an image, changes the apparent resolution of an image by, for example, presenting several image pixels as one display pixel or vice versa. This mechanism might at first appear to overcome the problem of changing the length scale of the image to its original value, but instead causes a different set of problems. To realize the drawbacks associated with such a solution, consider a typical 21 inch monitor. The size of such a monitor is similar to an A3 format paper (420 mm×297 mm). Typical monitors have a resolution of up to 1280×1024 pixels, corresponding to approximately 3 pixels/mm. Such a spatial frequency is lower than the typical mesh (5-7 lines/mm), and of the typical screened bitmap (80-100 spots/mm). Therefore, such a mesh may not be accurately reproduced by this method, since the process of performing the electronic "scaling" washes out the details of the printed mesh on the electronically displayed image.

Embodiments of the present invention describe a display system which may have variable pixel size, and an electronic scaling system that adjusts the resolution of the input data to the resolution of the pixels. Certain display systems used with embodiments of the invention may have an expanded range of colors, possibly due to the use of more than three primaries; other display systems may use conventional RGB colors or no color—e.g., black and white. Embodiments of monitors, systems, or methods which may be used with or modified to be used with embodiments of the present invention are disclosed in International Application PCT/IL01/00527, entitled "Device, System and Method For Electronic True Color Display," filed Jun. 7, 2001, and published Dec. 13, 2001 as WO 01/95544, assigned to the assignee of the present application, the entire disclosure of which is incorporated herein by reference, and International Application PCT/IL01/01179, entitled "Spectrally Matched Print Proofer," filed Jun. 7, 2001, published on Jun. 27, 2002 as WO WO02/50763 and assigned to the assignee of the present application, the entire disclosure of which is incorporated herein by reference. While the methods and systems disclosed in these patent applications (for example, methods to convert source data to primary data, or methods of creating primaries or filters) may be used in or with embodiments of the present invention, the device, system and method of the present invention may also be embodied in conjunction with other display technology.

Embodiments of the present invention feature a combination of optical zoom system and electronic "scaling," in order to provide an accurate electronic display of the image, which corresponds to the appearance of the image when printed. Other features and solutions may also be used. While in one embodiment the scale (the number of spots in the original image to each pixel displayed on the monitor) is 1:1, other scales may be used. Moiré effects, which correspond to those effects expected with a print version of an image, may only be seen on an electronic display if the image data has the same length scale on the electronic display as on the printed copy. Embodiments of the present invention may enable the combined magnification of the optical zoom and the electronic scaling to be unity or substantially unity, such that both resolution and length scale of the original image and the displayed portion can be matched, namely the size of the displayed pixel on the viewing screen may be adjusted to match the size of the respective data as appears in print. Furthermore, such embodiments may have the advantage of being used in screen-examination mode or a full image view mode. Certain embodiments of the device of the present invention are provided through a projection-based display; other displays may be used.

In one embodiment, there are two modes of operations. In one mode, the entire image to be proofed may be displayed in a resolution and size not necessarily permitting detection of certain print effects. In a high resolution mode each spot is mapped to a pixel in the displayed image. The optical zoom adjusted the size of the displayed pixel as seen on the viewing screen to match the required spot size for the given spot resolution. The data mapping is a bit-to-pixel mapping, and the color of that pixel may be determined by, for example, the four CMYK bits corresponding to that pixel.

In this embodiment, if the screened file has a resolution of, for example, 100 spots/mm and using typical industry parameters, a display device having approximately 1280×1024 pixels can present, an image area of $1.28 \times 1.024 \text{ cm}^2$ can be presented, where each spot on the image matches one pixel on the SLM. If color separations are used, each pixel on the displayed image may match a set of spots from the original, each spot coming from one color separation. Other screened file resolutions may be used, and, typically, the device may alter its projection zoom to account for other file resolutions.

The use of an optical zoom provides flexibility with bitmap resolution. The image of a pixel in the display may be magnified (the magnification can be less than one or greater than one, e.g., enlarged or reduced). The magnification can be adjusted so that the resolution of the image is the same as or substantially the same as the resolution of the bitmap. Therefore, the same system can be used for presenting various bitmap resolutions.

In other embodiments, the displayed image may be electronically zoomed so that a larger portion of the image is displayed, but at a resolution lower than 1:1.

In a typical printing application, the mesh period is typically about ten or more times larger than the spot size. Typically, the printing dot mesh is 5-7 lines per mm (approximately 130-175 LPI. The variations in the image are usually at spatial frequencies much lower than the mesh frequency. Therefore, according to the Nyquist sampling theorem, for a good representation of phenomena in the original image on scale larger than the mesh period of the printed image (but not exact representation of phenomena on scales smaller than the mesh period, namely less than perfect representation of the dot shape and effects associated with it), the image resolution (when presented on the display) should be typically at least two times higher than the mesh frequency (or for better performance 4-5 times higher). Thus, to reproduce common original print images for proofing, an image resolution of about 15 pixels/mm is suitable (approximately 380 LPI); other resolutions may be used for different originals, to reproduce different print phenomena, or if different accuracy levels are desired. In such a case, electronic scaling may be employed to collect several bits into one pixel of the image. A device according to some embodiments of the invention may be capable of replicating Moiré patterns associated with wrong grid angles, or with interference between mesh frequencies and image frequencies, but may not be capable of presenting Moiré effects associated with resolution of the screened file, since the electronic scaling may wash out the finest details.

Using these typical industry parameters, a display device having approximately 1280×1024 pixels can present for print proofing an 85×68 mm² area of a print original having a typical resolution, which is a reasonably large portion of an A3 image (420×297 mm²). However, the physical resolution of the display device might be very different from 15 pixels/mm. An optical zoom is applied to adjust the size of the displayed pixel as viewed on the screen, so that the resolution of the image on the viewing screen is 15 pixel/mm. Other zoom amounts may be used, and the zoom may be positive or negative. Furthermore, according to one embodiment of the invention, an electronic "scaling" of the bitmap data may be used to match the bitmap resolution of the printed material of the order of 100 spot/mm to the required resolution of 15 pixel/mm. Such electronic scaling may combine multiple spots in the original image to single pixels in the displayed image, allowing a larger image area to be displayed, or may display a certain number of spots in the original image using more pixels in the displayed image. The combination of the electronic "scaling" and the optical zoom allows a large portion of the image to be displayed on the monitor at the same size as the original portion, and at resolution which is high enough for detecting artifacts.

Figure 3:
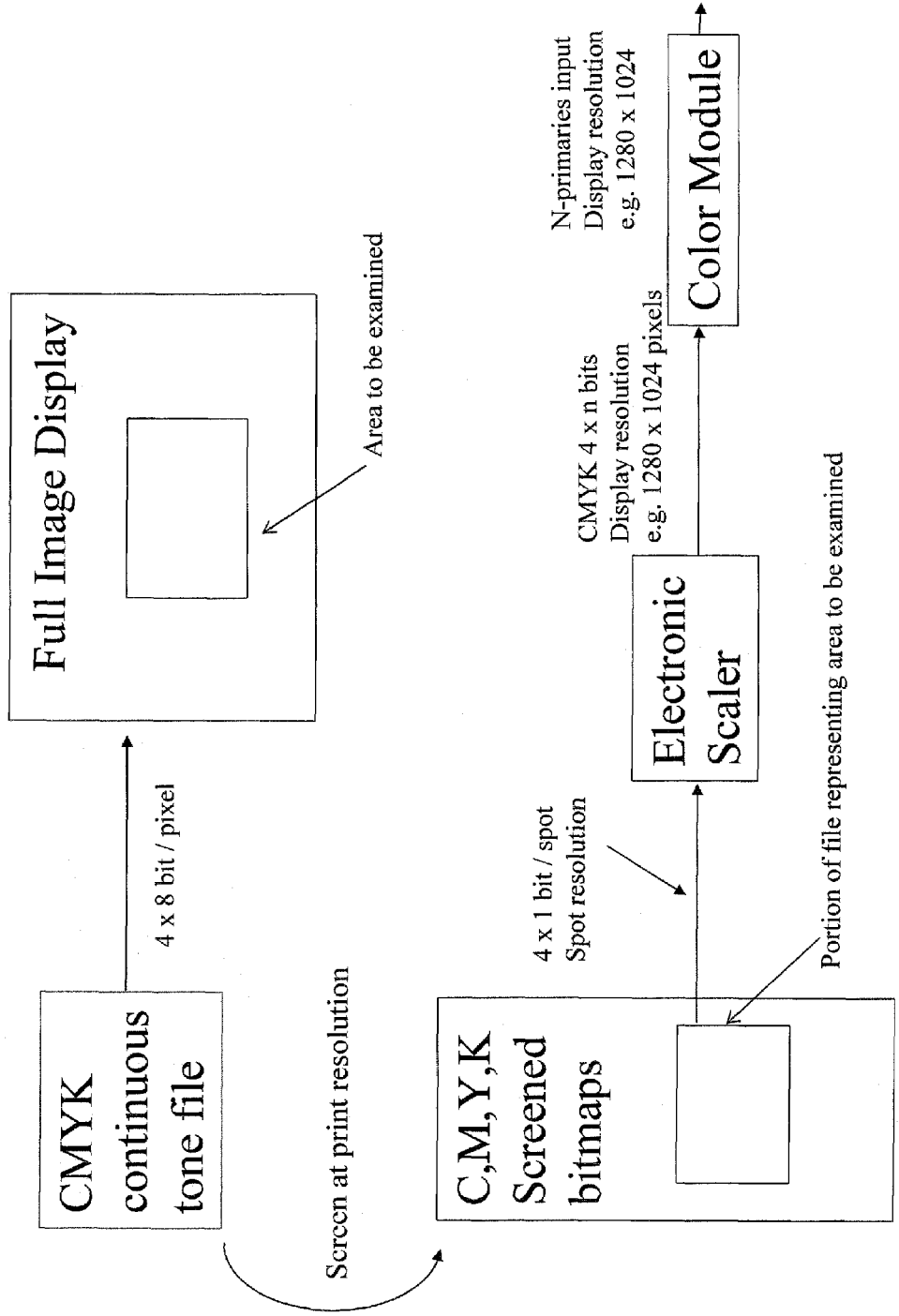
FIG. 3 illustrates a sample data flow used in a system and method according to one embodiment of the invention
Figure 4:
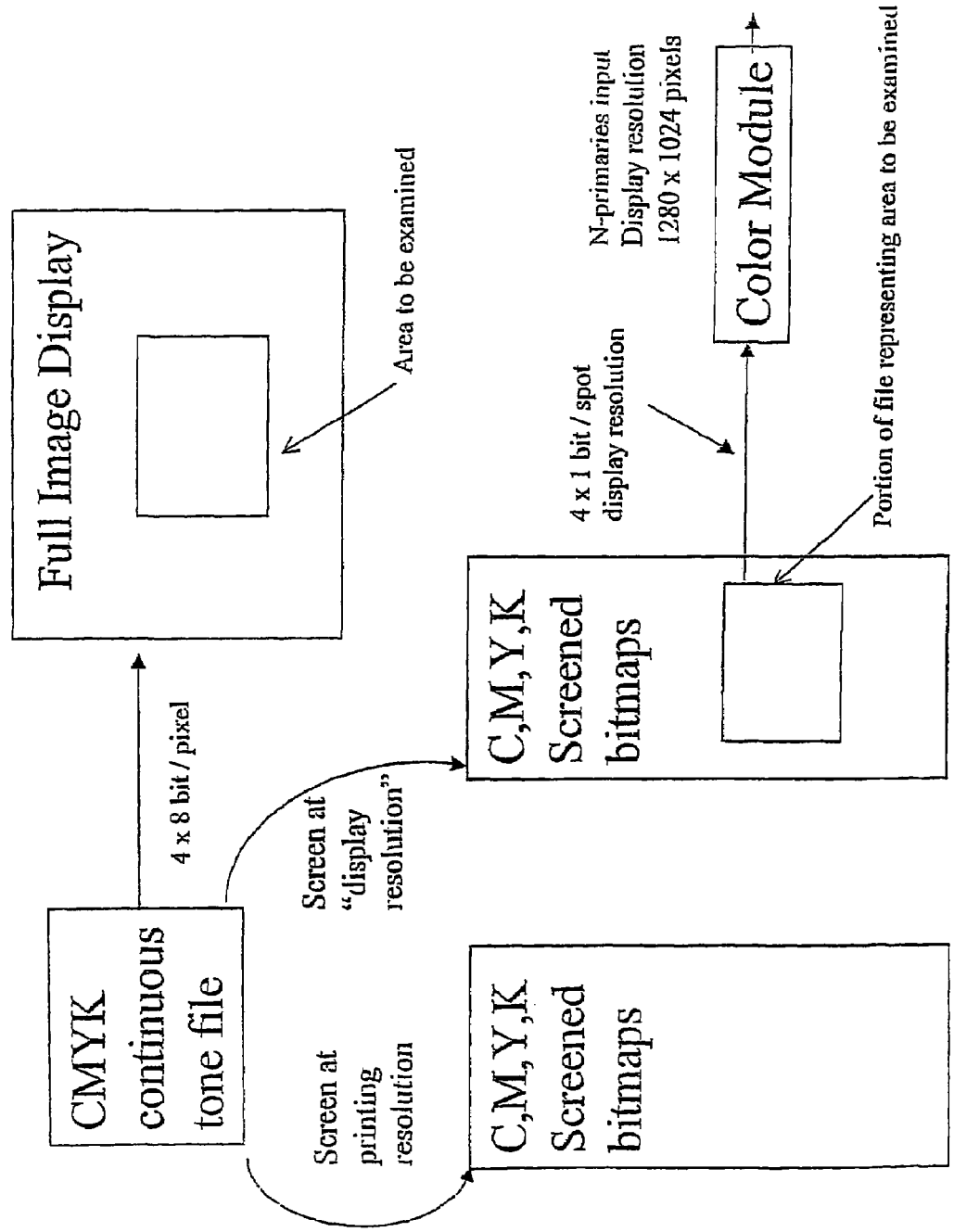
FIG. 4 illustrates an additional sample data flow used in a system and method according to an embodiment of the invention.
Figure 5:
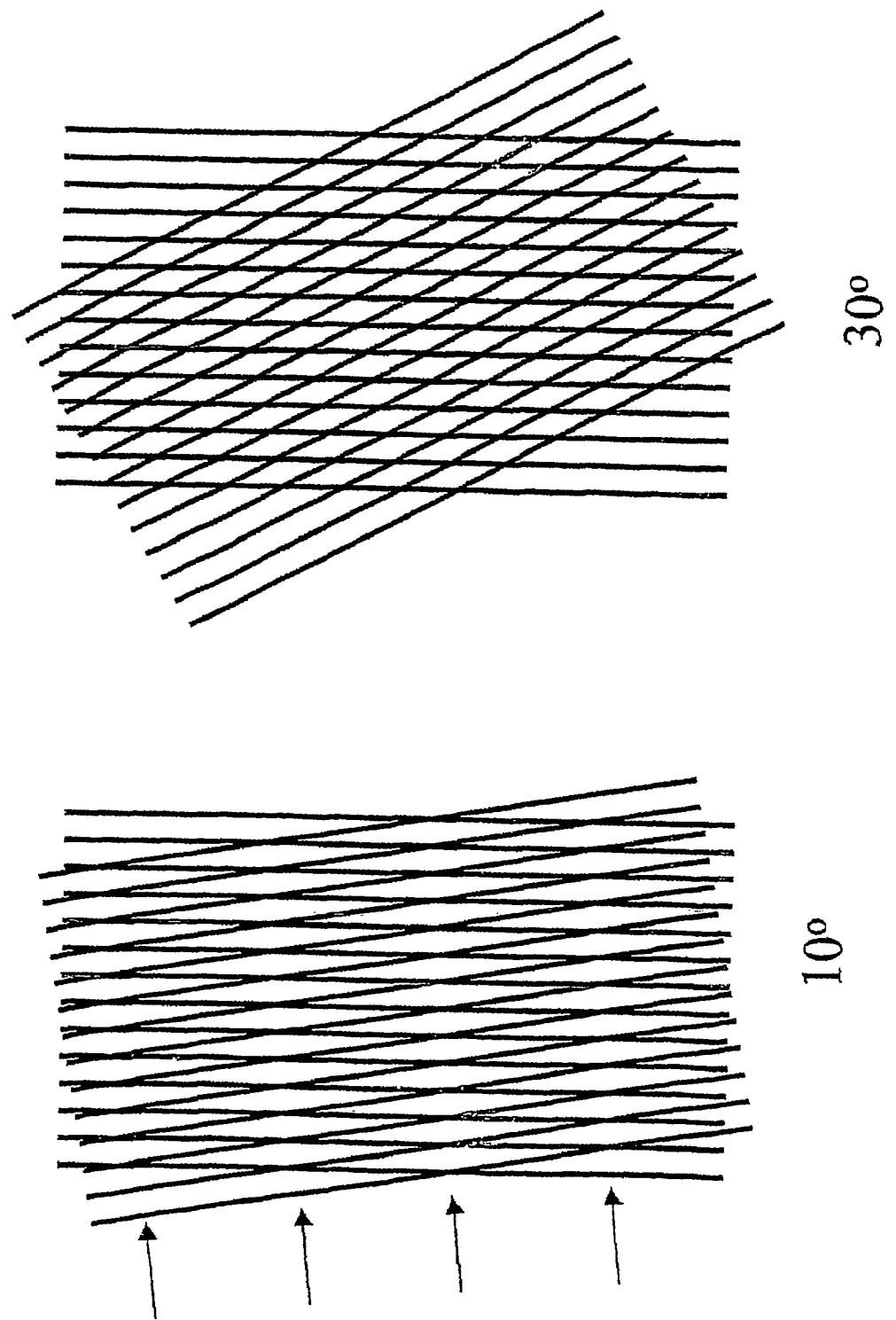
FIG. 5 is an example of a Moiré pattern created by two linear periodic grids.

FIG. 3 illustrates a sample data flow used in a system and method according to one embodiment of the invention. Referring to FIG. 3, a continuous tone file, e.g., an 8 bit CMYK continuous tone file, may be displayed in its entirety on a monitor according to an embodiment of the present invention. The continuous tone file is screened to a set of color separation files (e.g., CMYK separation files), and the portions of these files corresponding to the portion of the displayed image to be examined are scaled and undergo color conversion, and the resulting primary data is displayed on the monitor. FIG. 4 illustrates an additional sample data flow used in a system and method according to an embodiment of the invention. Referring to FIG. 4, instead of using electronic scaling, screen data can be retrieved from a file, which is screened at a lower resolution than used in printing. The continuous tone file is "RIPed" (Raster Image Processed) to both a set of color separation files at printing resolution, and to a set of color separation files at a resolution suitable for accurate proofing on the monitor. The relevant sections of the second set of files are selected for color transformation and display on the monitor. For example, if the screened file resolution (the resolution of the file displayed on the screen) is 16 spots/mm, which is still much higher than typical meshes in the range of 5-7 dots/mm, the image area which can be presented with such a display, given a certain number of pixels displayable, given a typical print mesh resolution, is 8×6.4 cm². Of course, other data flows are possible, and other data formats, other methods of representing color data, and other ink systems are compatible with embodiments of the present invention.

Typically, the combined magnification of the electronic scaling and the optical zoom is such that both the resolution and length scale of the original image can be matched. In one embodiment, 1:1 bit to pixel mapping is not used (e.g., electronic scaling is used), and less than perfect, but still useful simulation is obtained; Moiré and other artifacts may be seen over relatively large areas of the image. In such a case, effects associated with interference on scales shorter than the mesh period (e.g., spot resolution effects) may not be observed. In another embodiment, 1:1 imaging is used, and each printing spot is displayed in a pixel on the monitor. In such a case, due to possible limitations in the number of display pixels, the size of the displayed portion may be too small to discern print effects whose periodicity is larger than the size of the displayed portion. Of course, monitors according to embodiments of the present invention may include numbers of pixels sufficient to display relatively large areas of an image to be proofed as a 1:1 representation.

One embodiment may display an image in, for example, a full image view mode where the user may view the full original image and select a portion for proofing. The user may then switch to screen-examination mode and view the proofed portion. The original may be displayed on one monitor (for example, a conventional monitor), and the proofed portion may be displayed on a second monitor, a monitor according to the system and method of the present invention. Alternately, both portions may be displayed on the same monitor, or only the proofed portion may be viewed.

Figure 6:
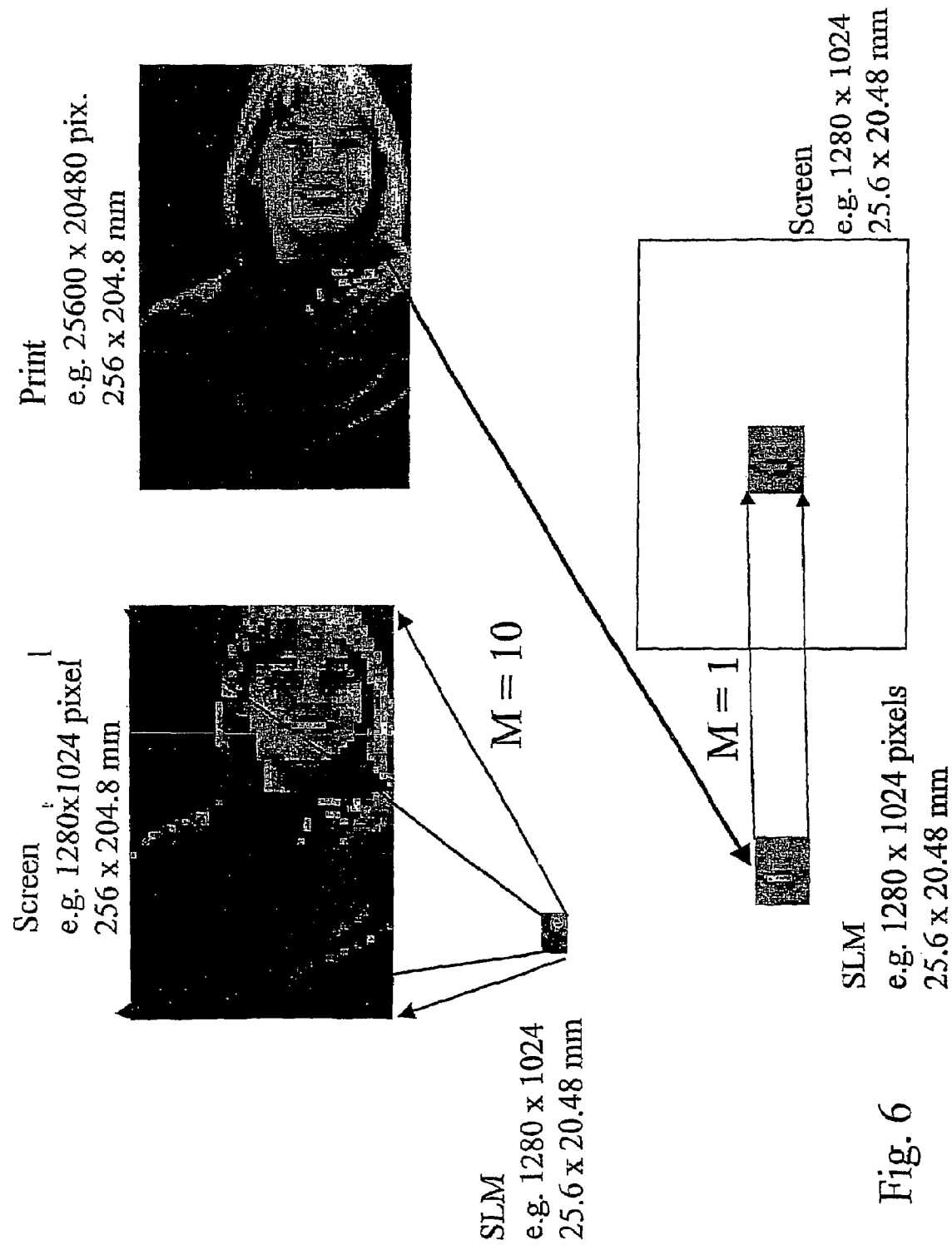
FIG. 6 depicts an image displayed by an embodiment of the invention.

FIG. 6 depicts an image displayed by an embodiment of the invention. The specific dimensions and pixel counts as shown in FIG. 6 need not be used. Referring to FIG. 6, if all the pixels in a display are used to reproduce a certain CMYK image, the resulting resolution is not satisfactory for analyzing print effects. If, however, all the SLM pixels are used to recreate a portion of the image, and that portion is displayed at the same scale as the portion in the original image, print effects may be discerned.

The original print image enjoys the high resolution of the printing media. When it is displayed on a typical display having a resolution of, for example, 1280×1024 pixels, much of the original resolution details are lost and artifacts that appear on the printing media such as Moiré effects will not be visible. However, implementation of optical zooming and electronic zooming that will result in an overall magnification of the original image of substantially 1 (wherein substantially 1 includes 1) enables the viewer to see an image with substantially the same geometrical scale and a similar resolution as the printing media. The size of the print image should be substantially identical to the size of the electronically displayed image, and each display pixel (or set of display pixels, where set includes a group of one) should represent a set of print image spots whose area is substantially identical to the area of the display pixel (or display pixel set). The number of pixels or picture elements used to create the displayed image may differ from that of the print image. Therefore, artifacts may be detected in the electronic image. Typically, the pixel size when seen on the monitor should be smaller than the mesh spatial period by at least a factor of two.

Various embodiments of the system and method of the present invention provide a display which may accurately reproduce artifacts that may occur when using halftone or other printing processes. One embodiment of the device, system and method of the present invention is based on projection-based displays, described with regard to FIGS. 7A and 7B. Typically, in projection-based displays, light passing through or applied to a pixilation device such as a spatial light modulator (SLM) produces pixilated light which produces an image on a display screen, typically via a magnification device such as a zoom projection lens. The image may be spectated from the rear of the screen or from the front of the screen. A typical SLM is a grid of light valves that behaves like an electronic slide and has a fixed pixel resolution.

The projection lens is used to image the SLM face onto the viewing screen. Using a zoom lens the size of image on the viewing screen can be adjusted so that it will be the same as in print. Following this optical zoom operation, the resolution of the data loaded to the SLM is set, namely each pixel represent certain length in the viewed image. By using electronic "scaling," the resolution of the screened file can be matched to that required for the SLM. An SLM with resolution such as SXGA, 1280×1024 pixels, and small pixel pitch (e.g., less than 20 μm between pixels) produced by several manufacturers such as Micropix, Displaytech or Texas Instruments DMD may be used. Other SLMs or pixilation devices may be used. A portion of the screened file is chosen; for example, by the user, or automatically. The relevant portion of the screened file is loaded into the SLM (pre-processing may take place). The correct scale of the image is typically set by controlling the magnification of a magnification device such as a zoom projection lens.

In an embodiment using projection display technology, light from a light source is, after processing such as filtering using color filters or a spatially modulated mask (SLM), projected on a screen for display in order to present colored images. In certain embodiments, a display according to the present invention may be used with features for displays as described in the International Applications PCT/IL01/00527 and PCT/IL01/01179, listed herein. In alternate embodiments, the system and method of the present invention need not be used with features as described in International Applications PCT/IL01/01179 and PCT/IL01/00527. A display according to the present invention that is based on the systems disclosed in International Applications PCT/IL01/01179 and PCT/IL01/00527 may include additional components and systems, such as a zoom/pixel magnification capability and components computing the transformation from an original image to an image to be displayed on the display.

The pixels in a display according to one embodiment of the present invention may be displayed at various sizes or resolutions on the screen. Thus, while on a conventional display, the X×Y total pixels which are available are always displayed at a certain resolution and always filling the entire screen, in a display according to an embodiment of the present invention, the X×Y total pixels available are displayable on patches of varying sizes, where the pixel size may be varied.

During use, the image file representing the original image to be proofed is loaded. The entire image may be presented to the user; at such a resolution artifacts such as Moiré effects are typically not visible, as the resolution of the display is typically not great enough. If the display is to display artifacts such as Moiré patterns, the resolution is typically increased; however, only a finite number of pixels are available. Thus, a portion of the image is selected for display and this portion is displayed on the display in a size and resolution comparable to the original. Therefore, typically only a portion of the display is used to display the image portion, while all of the pixels may be used. In alternate embodiments, if the size of the image or the number of pixels in the display permits, the entire image may be displayed at the appropriate resolution for proofing.

The user selects a portion of the image to be displayed for proofing. Typically, the proof image data is displayed on the display as an inset or patch presented on a portion of the entire screen, but may be displayed in other manners. Processing circuitry disposed at the monitor, disposed on an external device such as a PC or workstation, or on a graphics card associated with the monitor or other device, such as a known microprocessor or graphics processor, transforms the relevant portion of the original image to data suitable for display on the monitor, and determines a proper zoom level for the resulting proof image. Such processing may also be performed partially or entirely in software, for example on a PC or workstation. Thus units 202-207 (FIG. 7b) may be implemented in hardware or software, together in one processing unit or distributed across different processing units, and possibly as physically separate components. For example, one or all of units 202-207 may be implemented as a computer on a chip, a graphics processor chip or card, or a general purpose computer running a computer program.

Figure 7A:
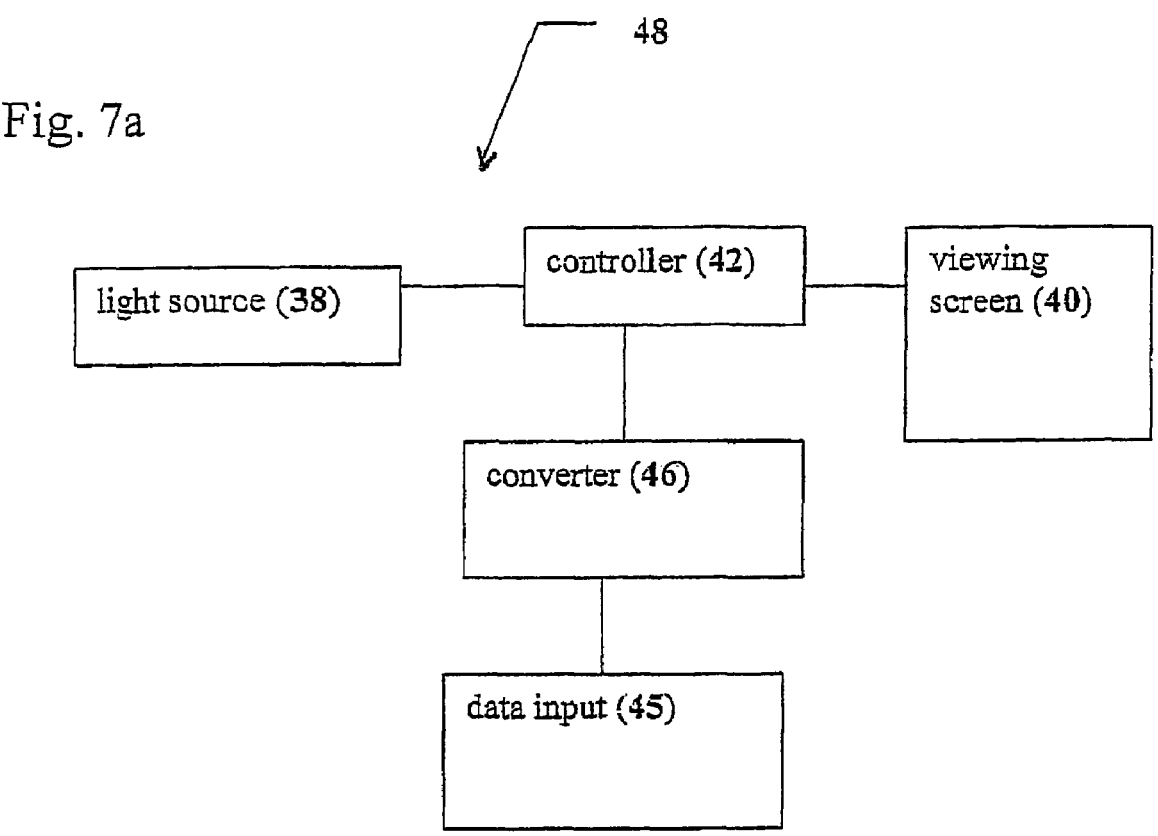
FIGS. 7A and 7B are schematic block diagrams of a display device and system according to embodiments of the present invention.
Figure 7B:
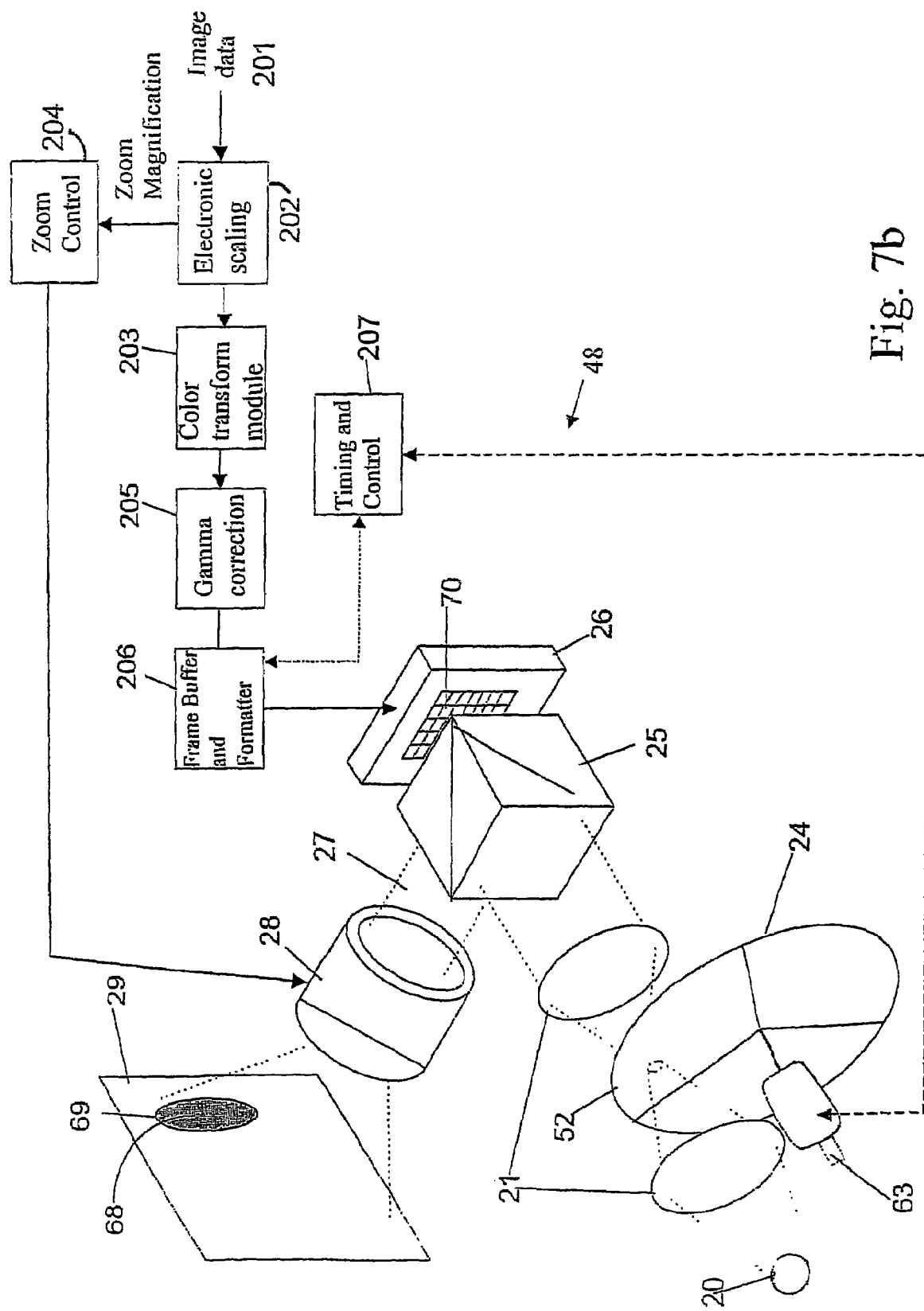

FIGS. 7A and 7B are schematic block diagrams of a display device and system according to embodiments of the present invention. It should be noted that other types of display systems could also optionally be used with the method of the present invention, such that these implementations are only intended as illustrative, non-limiting examples. For example, the embodiments herein are described in terms of color projection, which is very suitable in reproducing the color of prints, but other projection systems including white/black projectors can also be applied.

As shown in FIG. 7a, a system 48 features a light source 38 for producing light, typically producing at least three colors, RGB. More colors may be used for accurate color match to printed material. For example, one embodiment uses at least four primary colors, and one embodiment uses at least seven primary colors: C, M, Y, R, G, B and white, fitted in spectrum to that of the process inks, their overlaps and the paper under the required illumination conditions. Other embodiments may use other numbers of primaries which may spectrally reproduce the spectra resulting from an ink system, such as the CMYK ink system which produces CMYRGB and White spectra. In further embodiments, the light source 38 may produce only white light (for a black and white system).

The light from light source 38 is displayed on a viewing screen 40 (rear or front screen), thereby enabling the human viewer to see the colors of the displayed image 69 (FIG. 7b). In order for each color to be properly displayed in the correct location of the displayed image, a controller 42 controls the production of light of each color, such that the correct light reproducing the pixel is shown at the correct location of viewing screen 40. Optionally, controller 42 is separate from light source 38, such that these two components are not combined into a single component.

In one embodiment of the invention light source 38 projects light without being able to control the location of the projected light onto viewing screen 40. Controller 42 then determines the relative location of light as projected onto viewing screen 40, for example with a spatial light modulator and/or another system of mirrors and/or lenses, as described in greater detail with regard to FIG. 7b. Particularly, the controller 42 determines the relative location of the light projected onto the viewing screen 40, taking into account the optical zoom magnification.

In order for controller 42 to be able to determine the correct light to be displayed at each portion of viewing screen 40, controller 42 typically receives data from a data input 45, which may optionally be digital or analog. Controller 42 also receives instructions and/or commands from a converter 46, which is disposed logically between data input 45 and controller 42. Converter 46 converts the data from data input 45 into a format that is suitable for controller 42, and also includes any necessary instructions and/or commands for enabling controller 42 to be able to understand the data. Optionally, converter 46 also performs the electronic scaling of the data, and transmits the scaling ratio to the controller 42, which magnifies the image optically according to this ratio. Optionally, converter 46 may also convert the data from an analog signal to digital data, such that controller 42 is only required to receive digital data.

Converter 46, data input 45, and controller 42 may operate and have a structure similar to sections of various embodiments of the systems and methods described in International Applications PCT/IL01/00527 and PCT/IL01/01179, described herein. For example, in various embodiments of the present invention, the conversion from print data to display primary data or the choice or definition of display primaries may be performed according to the aforementioned International Applications; other methods and systems may be used. In various embodiments, converter 46, data input 45, and controller 42 may produce primary levels for conventional RGB primaries, for a set of primaries including at least four primary colors, or for only white light (for a black and white system). For example, it is known to perform very simple translation from CMYK data to RGB data, where the resulting colors are representative of, but do not accurately reproduce, the CMYK data.

FIG. 7b shows a display device according to an embodiment of the present invention which includes elements of a sequential light projection system such as those suggested in U.S. Pat. No. 5,592,188, which is hereby incorporated by reference as if fully set forth herein. This embodiment of the present invention is only illustrative and is not intended to be limiting in any way. In particular, some embodiments herein is described in terms of color projection, which is very suitable in reproducing, for example, prints, but other projection systems including white/black projectors can also be applied.

Color can be realized, for example, by filtering a wide spectrum (close to "white") source through splitting into fixed filters, e.g. RGB filters, passing through a moving color wheel, passing through dichroic optical elements performing color separation or any other optical means for separating of RGB colors and/or any other color primaries combination. A system 48 is based on passing white light from a source 20 through appropriate color filters 52 to form colored light. For color representation, at least three colors (e.g., RGB) are typically used. Alternatively, other methods of producing light of various colors may be used; for example, light emitting diodes or lasers emitting primary colors.

Systems that use more than three primaries, or which use a set of primaries to spectrally reproduce the spectra produced by an ink system may be used. Such systems may more accurately reproduce the colors produced by the original image. In one embodiment, more primaries, for example produced by seven (six colors+white) colored filters 52, may be used, but less colors are also possible. The transmission spectrum of these seven color filters is typically very close to that of the standard inks and overlap colors used in the relevant printing application. Optionally, the seven colors are C(yan), M(agenta), Y(ellow), R(ed), G(reen), B(blue) and white. For Black/White system the filters may not be required.

The filters as shown may optionally be configured in a color filter wheel 24. In order for the light to be directed through the appropriate filter 52, typically the light is focused by a condenser lens 21, optionally implemented as two such lenses 21 for the purposes of illustration only and without any intention of being limiting. The focused light is then directed through one of the filters on filter wheel 24, which holds the color filters 52, and which typically rotates at the appropriate frequency. In this example, the combination of light source 20, and color filters 52 can be considered to form at least part of the light source of FIG. 7a, optionally with other components involved in the production of the light itself The colored light illuminates a spatially modulated mask 26, also known as an SLM (spatial light modulator) which determines, typically by pixel, whether and how much light of the color currently being projected through the color filter wheel 24 is permitted to pass for illuminating that pixel. The colored light for an image 69 is then projected by a projection zoom lens 28 onto a viewing screen 29. Viewing screen 29 displays the resultant colored image 69 to the user, and the image 69 may be viewed from rear or front. In the case of a black and white display, color wheels need not be used. Spatially modulated mask 26, or the combination of spatially modulated mask 26 and projection zoom lens 28, can be considered to be an example of the controller from FIG. 7a. In alternate embodiments the controller or portions of the controller may be embodied in other manners, for example in software on a personal computer or workstation. Zoom lens 28 may act as a magnification device, selectably adjusting the size of each pixel displayed on viewing screen 29. Other magnification devices and methods for adjusting magnification may be used.

A motor 63 optionally rotates filter wheel 24 in front of light source 20, so in each turn spatially modulated mask 26 is illuminated by all colors in filter wheel 24 sequentially. Typically, the rate of rotation is at the frame frequency (and/or its multiples), which is the frequency at which the full-color image 69 on viewing screen 29 is refreshed. Typical frame frequencies are in the range of 30-85 Hz; other frame frequencies may be used.

Typically, the loading of the data into spatially modulated mask 26 is synchronized by a timing system 207, according to the rotation of filter wheel 24. The light beam is spatially modulated by spatially modulated mask 26, so that the apparent brightness of each primary color varies at different portions of viewing screen 29, typically according to each pixel of the image 69. Each position 68 (e.g., a pixel shown on the display) of image 69 on viewing screen 29 is typically associated with a certain pixel 70 in spatially modulated mask 26. The brightness of that position 68 (for a particular color) is determined by the relevant data pixel in the image. Data representative of the image is typically retrieved from an image data file or set of files 201 and converted from the input data (e.g., print data) to data appropriate for the primaries of the display. The human viewer integrates the sequential stream of the primary images to obtain a fill color image. In one embodiment, using a 7 segment ink-like primaries method the appearance of the image on the screen 29 may be close to a spectral match with the image on paper, given a certain illumination.

The display systems according to certain embodiments of the present invention are based on spatially modulating colored light and projecting it on a display screen. The spatial modulation can optionally be performed by using a liquid crystal spatial modulator, in which case a source of polarized light is typically used, or alternatively by a digital micromirror device (DMD) produced by Texas Instruments (USA) for example, which allows the use of non-polarized light. Other types of devices for performing spatial modulation are optionally used, and are encompassed by the scope of the present invention.

The spatial modulation can optionally be performed with analog or binary levels or gradations, according to the type of modulator device which is used. Nematic liquid crystal modulators, for example by CRL Opto ((United Kingdom), or Kopin Inc. (USA), allow for analog "gray levels", while Ferroelectric liquid crystal modulators, such as from Micropix Technologies (United Kingdom) or LightCaster™ from Displaytech (USA), and DMD are binary devices. If a binary modulator device is used for spatial modulation, "gray levels" may be achieved by controlling the duration of the illumination, and/or the intensity of the light, incident on the spatial modulator.

An implementation using liquid crystal modulators may require the use of polarized light. Such an embodiment is depicted in FIG. 7b. For reflecting devices, such as Liquid Crystal Over Silicon (LCOS) devices, the same polarizer, usually a polarizing cube beam splitter, can be used for polarizing the incident light and for analyzing the reflected light. The implementation shown in FIG. 7b is based on a reflecting LCOS device for spatially modulated mask 26, and therefore a polarizing cube beam splitter 25 is included in system 48, from which polarized light 27 is transmitted to projection zoom lens 28. It should be noted that this is for the purposes of illustration only, and other implementations of system 48 are also possible as based on other modulators, such as those devices which are described as examples of other such spatial modulation devices.

Many suppliers of SLM provide an electronic interface to their devices. Often, these interfaces implement dithering, error diffusion and other similar algorithms for color presentation. Typically, these algorithms are avoided for the screen simulation application, because they spatially mix the data of neighboring pixels.

The portion of the image data file 201 that is converted to the appropriate data and loaded into the SLM is determined by the area that is examined. After the user determines the area he would like to view, the data representing this area is retrieved from the screen file, together with the screened file resolution. The data organized in two-dimensions has one bit for each spot element. The number of spot elements along and across multiplied by the screen file resolution yields the required size of the image. An electronic scaling module 202 may scale the relevant portion, as discussed in more detail herein, by, for example, sub-sampling or interpolating between the existing image elements (spots), in such a way that the number of elements in the scaled image is the same as the number of pixels in the SLM (however, the same scaling factor is used in both directions in order to keep the geometry). In alternate embodiments the number of pixels in the scaled image may differ from the number of pixels in the SLM. As discussed in more detail herein, a proper zoom or magnification for the image 69 is determined by, for example, the zoom control 204. The zoom control unit 204 controls the zoom lens 28 by, for example, sending signals adjusting the zoom; thus the magnification (positive or negative)-of the image 68 is adjusted. In such a manner the length scale of the projected image of the SLM is the same as that of the relevant portion of the original image, (known from the original number of retrieved elements and the spot resolution). In alternate embodiments, other units or combinations of units may perform the calculations and transformations discussed herein; for example, units such as units 202, 203 and 204 may be combined to one unit.

The scaled data is typically converted to data suitable for the primaries of the display. Following the scaling, several spot elements are typically collected together to give one pixel of the scaled data, which is now a gray scale pixel as discussed below with respect to FIG. 8. In the case of color separation data, the spot elements corresponding to the same pixel of each of the separations give together, for example, a CMYK value for this specific pixel. The calculated color data (e.g., CMYK data) of the scaled portion of the file is transformed by a color module 203 to, for example, RGB values, CMY RGB White values, or to other display primary values, as appropriate. In alternate embodiments, other numbers of primaries may be used. In monochrome embodiments, units such as the color wheel 24 and the color module 203 may be eliminated. Methods and systems used with embodiments of the present invention to convert data may be those described in International Application PCT/IL01/00527 and International Application PCT/IL01/01179; in alternate embodiments, other methods may be used. In some embodiments, data conversion from input data to display primary data may include, for example, correction for print process parameters such as dot gain, trapping, or density. Further, correction may be made for, for example, viewing conditions such as lighting, or the substrate (e.g., paper, cardboard) used. The data of each primary color may, for example, be corrected by an optional gamma correction 205 (e.g., gamma correction curves) for non-linearities of the display device and sequentially loaded into the relevant pixel of the SLM by the frame buffer and formatter 206, according to the timing determined from the color wheel rotation.

Figure 8:
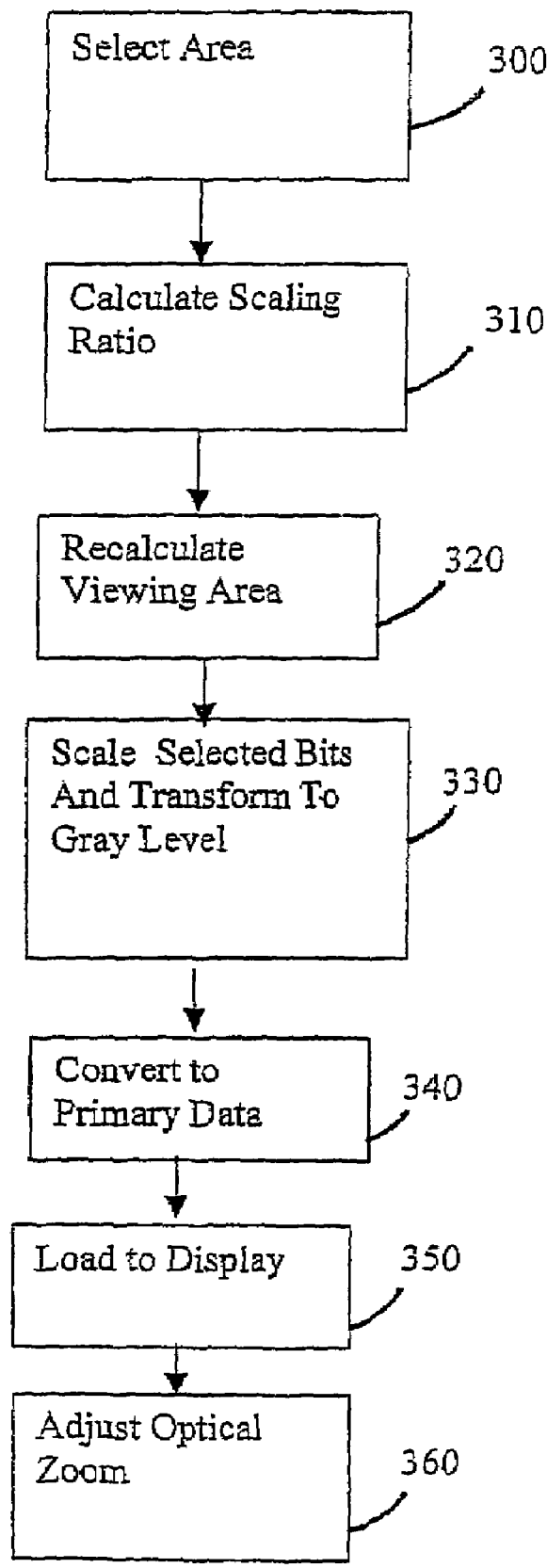
FIG. 8 is a flowchart of a method according to an embodiment of the present invention.

FIG. 8 is a flowchart of a method according to an embodiment of the present invention. In alternate embodiments, other sequences of steps and other methods may be used. In one embodiment, the method is performed by units 202-207 of FIG. 7b.

In one embodiment, the color data of the input data is expressed as ink data or ink levels—e.g., CMYK data. In other embodiments, the color data may be expressed in different manners (e.g., a set of color levels for pixels), or need not be included. The input data may be a set of files corresponding to the print data. Thus the data file 201 may be, for example, both a set of files representing a CMYK continuous-tone digital image file (e.g., 8 bit/separation CMYK dot area for each pixel), and a set of four-separations CMYK screened bitmap files (e.g., 1 bit/separation for each spot, one file for each separation). Within each set, each file corresponds to one print ink—for example, C, M, Y and K. For the second set, within each file, a spot is represented by a bit—1/0, for print/not print. Thus, in the C file, a 1 in a certain position in the file indicates that in the print process a cyan spot should be printed in the corresponding position. Typically, the continuous tone file is used to display the entire image, and the set of one-bit separations is used to display the area selected to be examined. However, embodiments of the present invention may accept either format for display of an overall image and/or an area to be examined for print effects. Of course, other file formats, and other ink systems, may be used. In one embodiment, since the continuous tone file is used to display the entire image, it may be an input to a separate monitor or system used to display the entire image, while a monitor according to an embodiment of the present invention may accept a set of separation files. Furthermore, since a set of separation files may be quite large, a portion of a separation file may be input to a monitor or system according to an embodiment of the present invention.

Referring to FIG. 8, in step 300, a portion of an image is selected. In one embodiment, the full-size image is first presented on the display, possibly based on CMYK continuous tone (e.g., 8 bit continuous tone) image data, and the user indicates the area to be examined and, possibly, the resolution of the screened bitmap. The overall image may be based on other image data, in another file format. Such an indication may be using, for example, a pointing device such as a mouse; alternatively other interface devices may be used, such as a keyboard. The user may indicate a certain portion to be proofed, or may select a portion to be proofed in another manner. For example, a user may draw a box around an area to be viewed. Other methods of determining an area to be used and scaling may be used. User control or selection need not be used.

In step 310, the most appropriate electronic scaling ratio may be calculated given the number of pixels available for display. Alternately, a user may request a certain electronic scaling level, along with a general target area (or the center of such an area), and the area to be viewed may be determined.

In one embodiment, given the area of viewing of length L and width W (the ratio L/W is typically assumed to be the same as that of the SLM ratio, but need not be), the number of spots in the screened file, corresponding to this length is given by $(L \cdot r) \times (W \cdot r)$, where r is the resolution on paper (e.g., spot resolution). Assuming that the length L is taken to determine the scaling factor (the width W may also be chosen), $L \cdot r$ bits are typically scaled into a row of the SLM, having N pixels (N=1280 for example; SLMs with other pixel numbers may be used). The scaling ratio is $L \cdot r/N$, and to avoid the creation of additional beat frequencies it may be rounded to the nearest integer, q.

In step 320, the dimensions of the viewing area may be recalculated. The dimensions of the area of interest or viewing area may be re-calculated based on the rounded ratio ($L'=q \cdot N/r$), and the relevant data is taken from the input print data file (e.g., the screened file). In alternate embodiments, only a portion of the SLM may be used for the proofed image, and another portion may be used for other image data, such as user interface data.

In step 330, the bits of the selected viewing area may be scaled and converted to gray levels. Typically, this involves converting at least a portion of the input data to data of a lower pixel resolution. In the case of multiple color separations data files (e.g., in the case of four-color CMYK data having four files or separations), this may be performed for each data file or separation. In one embodiment, each set of q×q spots of the screened data is presented by one pixel of the SLM. The average value of these $q^2$ spots is transformed into a gray level. In the case of a one-to-one correspondence between image spots and screen pixels, scaling and converting may not need be done. Furthermore, other methods of converting and scaling may be used. For example, a many to one correspondence need not be used; multiple input data pixels may be converted to multiple screen pixels, or a number of input pixels may be converted to a higher number of screen pixels. Conversion may use methods other than averaging or grayscale conversion.

In step 340, the gray scale data may be converted to data appropriate for the primaries used by the display. Data conversion need not be done; the input data (after possible electronic scaling as discussed with respect to step 330) may be suitable for direct use as display primaries. For example, if black and white data is used conversion need not be performed.

In one embodiment, if data conversion is to be performed, it is assumed that each pixel to be displayed on the monitor is formed from a set of v corresponding pixels converted in step 330, each of the v pixels corresponding to one of the color files (e.g., CMYK). The spectrum produced by each set of pixels may be created using, for example, the Neugebauer equations as discussed herein and/or in International Application PCT/IL01/00527 and International Application PCT/IL01/01179; other methods of producing the spectra may be used. The coefficients or proportions for sets of display primaries which can produce this spectrum may be determined using, for example, the steps discussed herein and/or in International Applications PCT/IL01/00527 and PCT/IL01/01179; other methods of producing primary coefficients or proportions may be used.

In such a manner, for each pixel of the display, a set of display primary levels may be produced. In other embodiments, other steps may be used to produce display primary coefficients. For example, if the display primaries correspond to the spectra produced by the inks (e.g., CMYKRGB in the case of CMYK inks), after the spectra produced by the inks is determined the data may be used more or less directly to drive the primaries.

The data of each primary color may be, for example, corrected for non-linearities of the display device.

In step 350, the data may be loaded to the display device. In one embodiment, the data is sequentially loaded into the relevant pixel of the SLM, according to the timing determined from the color wheel rotation.

In step 360, the optical zoom may be adjusted. In one embodiment, the resolution of the displayed image is given by $N/L'=r/q$. To observe Moiré effects this resolution is typically at least twice that of the mesh (preferably at least 4-5 times larger than the mesh). The optical zoom is adjusted, so that the pitch of the SLM pixels, p (pixels/mm) magnified by M is substantially equal to the image resolution r/q, namely $M=r/pq$. Assuming that typical resolutions for screen examination vary from 30-100 spots/mm, and that the reciprocal pitch of a typical SLM is in the range 50-80 pixels/mm, the optical zoom magnification typically ranges from 0.5-3. Other dimensions may be used, along with other electronic scaling and other magnifications.

In alternate embodiments, other steps or sequences of steps may be used.

The method described above with regard to FIG. 8 is suitable for various screening systems, such as FM and irrational screens. In conventional screens, separations are in angles of 0°, 15°, 45°, and 75°. Other rational screens have angles for which the tangents are rational number, while irrational screens have angles with non-rational tangents. The advantage of the use of such "irrational" separations is the avoidance of beats caused by the machine periods, which are usually in an angle of 0°, such periods coming from the period of the screw on which the printing head moves. These extra periods from the machinery might interfere with the screen periods and result in Moiré artifacts.

The simulation of conventional (0° and 45° separations) and rational screen (Hell angles) printing processes may in the addition of slight modifications to the method of FIG. 8, if Moiré effects associated with the SLM hardware resolution should be avoided. In the case of conventional screening, typically the ratio between paper resolution and mesh for the zero (and 90°) angle separation is determined as an integer, namely r/m=i. This integer ratio assures that a beat frequency is not created between the higher harmonics of the mesh and the resolution. If the resolution is scaled by an integer q, as performed with regard to the method of FIG. 8, while keeping the mesh the same, it is not clear that the ratio in the displayed image r/qm would remain an integer. If this ratio is not an integer, the creation of beats resulting in perceivable Moiré patterns can be expected.

In order to avoid such effects, the ratio between the resolution of the image and the mesh is also typically an integer, j. This means that the ratio between the screened file resolution and the displayed image resolution is i/j. Each i×i bits are collected together to form one dot with the average value of the $i^2$ bits. Then the new coarse data is interpolated on a grid of j×j pixels per dot. The resolution of the image is rj/i and should be equal to p/M, giving an optical magnification M=ip/rj.

Before being displayed, the scaled data is typically converted to data suitable for the primaries of the display. Following the scaling, several spot elements are typically collected together to give one pixel of the scaled data, which is now a gray scale pixel as discussed above with respect to FIG. 8. In the case that the color data is represented as color separations, the spot elements corresponding to the same pixel of each of the separations give together a scaled value, e.g. a CMYK value, for this specific pixel. This calculated data of the scaled portion of the file may be transformed by a color module 203 to, for example, RGB values, CMY RGB White values, or to other display primary values, as appropriate.

In most cases an accurate color match is not required for examining moiré effects, and a simple color conversion method may be used, converting data to, for example, data suitable for conventional RGB primary data. However, the display system described above can provide quite accurate color representation of the pixels using the color module 203. In one embodiment, part of the conversion from input data to display primary data may include converting the input data to a set of intermediate spectra, and converting the spectra to display primary data. Such processing may be performed in the monitor, in module 203 or, alternately, in a separate card or processing device, or in software. In addition, the display or device may also accept print process parameters or other information used to adjust the conversion, e.g. dot gain.

The input data may be processed by evaluating the spectrum at each pixel or spot according to, for example, its CMYK values. This spectral evaluation may be based on typical spectra of printing inks (known beforehand), and other process parameters, which are measurable in the print shop, including, e.g., dot gain. The evaluation may be based on other data In alternate embodiments, a spectral evaluation need not be done.

A spectrum $\phi(\lambda)$ corresponding to a certain CMYK data can be presented as a set of numbers $\phi_i = \phi(\lambda_i)$ each representing the appropriate value for a certain wavelength $\lambda_i$, where the points $\lambda_i$ may be uniformly or non-uniformly spread through the visible range (usually between 400-700 nm). Alternatively the spectrum can be represented as a set of coefficients $\beta_j$ representing the weights of predefined spectral basis functions $\Psi_j(\lambda)$, namely:

$$\phi(\lambda) = G(\Sigma \beta_j \Psi_j(\lambda)) \quad (1)$$

where G(x) is a pre-defined function. Typically, the second method is used, since description in terms of spectral basis functions requires smaller number of coefficients and therefore less memory and less calculations. Furthermore, cleverly chosen set of basis functions can reduce the problem of spectral estimation to simple manipulation of the CMYK values, namely that the coefficients $\beta_j$ are derived directly from the CMYK values using simple arithmetic as discussed below.

The spectrum may be created as positive linear combinations of the display primaries, namely:

$$\varphi(\lambda) \cong \sum_{k=1}^{n} a_k \chi_k(\lambda) \quad (1a)$$

Here $\chi_k(\lambda)$ is the spectra of the display primaries and $\phi(\lambda)$ is the spectrum to be reproduced. The spectrum, in either wavelength or basis weights representations, may be transformed to coefficients that represent the weight of each of the display primaries $a_1 \ldots a_n$. The calculated coefficients $a_1 \ldots a_n$ of the display primaries are used as the signals for the display itself In a typical embodiment, three primaries corresponding to conventional RGB primaries may be used, but in alternate embodiments, different primaries or more than three primaries may be used.

In the special case that the basis functions $\Psi_j(\lambda)$ are identical to the display primaries $\chi_k(\lambda)$, the spectral conversion module can be omitted, since the basis weights coefficients can be used as the signals for the display primaries. In any case, a suitable choice of the basis function and the display primaries allows for a simplification of the conversion module, namely the conversion module can be reduced to an n×m matrix, where n is the number of display primaries and m is the number of basis functions. The given basis function $\Psi_j(\lambda)$ can be represented as:

$$\psi_j(\lambda) \cong \sum_{k=1}^{n} c_{jk} \chi_k(\lambda) \quad (1b)$$

Since both the basis functions $\Psi_j(\lambda)$ and the display primaries $\chi_k(\lambda)$ are known the values $c_{jk}$ can be calculated and stored. Then for linear models, where G(x)=x the values $a_i$ of eq. 1a can be calculated by inserting eq. 1b into eq. 1 and comparing it with eq. 1a to obtain:

$$a_k = \sum_{j=1}^{m} \beta_j c_{jk} \quad (1c)$$

Eq. 1c represents a matrix multiplication of the vector $\beta$ by the matrix $C^+$, where $C^+$ is the transposed matrix of C. $C^+$ is an n×m matrix as indicated above. Examples of models that can be performed by the spectral estimator module include Murrey-Davis spectral Neugebauer model, Yule-Nielsen spectral Neugebauer model, Cellular spectral Neugebauer model and others. The Murrey-Davis spectral Neugebauer model estimates the spectrum of a CMYK pixel by:

$$\varphi(\lambda) = \sum_i F_i R_i(\lambda) \quad (2)$$

Here $\phi(\lambda)$ is the estimate of the spectrum reflected from the substrate, and $R_i(\lambda)$ are the spectral reflectivity of a set of elementary colors, for example i=RGB CMY KW. $R_i(\lambda)$ depends on the illumination conditions and substrate properties via $R_i(\lambda)=S(\lambda)R_w(\lambda) T_i(\lambda)$, where $S(\lambda)$ is the spectrum of the incident light, $R_W(\lambda)$ is the reflectance of the white paper (other substrates may be used) and $T_i(\lambda)$ is the transmission of the $i^{th}$ elementary color (ink or overlap of inks). It is usually assumed that the transmission of black layer $T_K(\lambda)$ is zero or negligible over the whole spectral range, however, correction for finite small transmission can also be implemented. Other functions may be used, with different of omitted factors.

The relative values of the composition $F_i$ may be given by the Demichel equations (other equations may be used, and other colors and spectra may be used):

$$F_c=C(1-M)(1-Y)(1-K)$$

$$F_M=M(1-C)(1-Y)(1-K)$$

$$F_Y=Y(1-C)(1-M)(1-K)$$

$$F_R=MY(1-C)(1-K)$$

$$F_G=CY(1-M)(1-K)$$

$$F_B=CM(1-Y)(1-K)$$

$$F_K=K+CMY(1-K)$$

$$F_W=1-\Sigma_{i\neq W}F_i \qquad (3)$$

Here C, M, Y and K are the respective dot areas of the relevant pixel as measured on substrate (typically after dot gain correction). Typically, the spectra produced by the black ink used in the printing process does not differ from that produced by an overlap of the C, M and Y inks; however, implementations where the spectra differ, where the blacks differ, are also possible. In such implementations, more Neugebauer values and primaries may be used to represent the blacks.

In terms of Eq. 1 the reflection spectra $R_i(\lambda)$ are equivalent to the basis function $\Psi_i(\lambda)$, the parameters $F_i$ are identical to the coefficients $\beta_i$, and $G(x)=x$.

For Yule-Nielsen spectral Neugebauer model eq. 2 is replaced by:

$$\varphi(\lambda) = \left\{\sum_i F_i R_i^{1/n}(\lambda)\right\}^n \qquad (4)$$

Here n is an empirical parameter, that for offset print is found in the range of 1.5-2. In terms of equation 1 the basis functions $\Psi_i(\lambda)$, are equivalent to $R_i^{1/n}(\lambda)$ and $G(x)=x^n$.

For a Cellular Neugebauer model eq. 2 holds, however more basis functions are used in intermediate values (not only at 100% values of the primaries and their overlaps), such as CMYK values. $F_i$ are calculated in each of the cells with respect to the corners of the cube enclosing the input point.

Once the data is calculated, it may be displayed as an image. In one embodiment the image is displayed using a projection display including, for example, an SLM. In alternate embodiments, other methods of displaying the data may be used. The data loading into the SLM may involve rearrangement of the data in a format consistent with the physical SLM (e.g., spatially modulated mask 26), and loading the data into the SLM at the required timing for producing each color in a sequential (time-based) projection system.

After the scaling and possible color transformation of the data, it is transferred to the frame buffer and formatter 206, which arranges the data in a format acceptable by spatially modulated mask 26, and provides the correct electronic and physical interface to spatially modulated mask 26. Frame buffer and formatter 206 also arranges the stream of data in a format consistent with the electronic requirements of spatially modulated mask 26. Frame buffer and formatter 206 may be, for example, a memory device for holding the data of the image. Typically, the data is held in the same geometrical arrangement as the pixels of the image, and of spatially modulated mask 26. The loading of the data into spatially modulated mask 26 is synchronized by a timing and control system 207, according to the rotation of color filter wheel 24. Other arrangements of components for creating a display are possible.

While the invention has been described with respect to a limited number of embodiments, it will be appreciated that many variations, modifications and other applications of the invention may be made. In particular, although the embodiments presented here are based on sequential projection engines, similar embodiments may be suggested based on simultaneous projection of each of the color channels (e.g., in a three-panel LCD based color projector). Nevertheless, the sequential implementation may be desired for the present invention, because minor misregistration of the three-panel optical system might result in a highly visible Moiré pattern, a problem that does not exist in the sequential implementation.

Embodiments of the present invention may include apparatuses for performing the operations herein. Such apparatuses may be specially constructed for the desired purposes (e.g., a "computer on a chip" or a graphics processor chip or card), or may comprise general purpose computers selectively activated or reconfigured by a computer program stored in the computers. Such computer programs may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems appears from the description herein. In addition, embodiments of the present invention are not described with reference to any particular programming language. It will be appreciated that a variety of programming languages may be used to implement the teachings of the invention as described herein.

Unless specifically stated otherwise, as apparent from the discussions herein, it is appreciated that throughout the specification discussions utilizing terms such as "processing", "computing", "calculating", "determining", or the like, typically refer to the action and/or processes of a computer or computing system, or similar electronic computing device (e.g., a "computer on a chip" or a graphics processor chip), that manipulate and/or transform data represented as physical, such as electronic, quantities within the computing system's registers and/or memories into other data similarly represented as physical quantities within the computing system's memories, registers or other such information storage, transmission or display devices.

It will be appreciated by persons skilled in the art that the present invention is not limited to what has been particularly shown and described hereinabove. Rather the scope of the present invention is defined only by the claims which follow:

What is claimed is:

1. A method for displaying at least a portion of an image, the method comprising:
    scaling spots of input data, said input data corresponding to at least a portion of an image, wherein said scaling correlates the spots to pixels of a display device, and produces a scaled image of said portion of the image; and
    conforming a size of said scaled image of said portion by optical magnification to produce a displayed image of said portion, such that the displayed image of said portion has substantially the same size as the actual size of said portion.

2. The method of claim 1 comprising at least controlling said magnification according to a ratio between a desired resolution and a resolution of said image.

3. The method of claim 1 comprising converting at least some of said input data into converted data of a lower resolution.

4. The method of claim 3, wherein said converting comprises combining a first number of pixels of said input data into a second number of combined pixels, said second number is smaller than said first number.

5. The method of claim 1, wherein said input data comprises color data, the method comprising converting at least some of said color data into converted color data corresponding to a plurality of primaries.

6. The method of claim 5, wherein said color data comprises ink data, said converting comprises:
    converting said ink data into intermediate spectra; and
    converting said intermediate spectra into the data corresponding to said plurality of primaries.

7. The method of claim 5, wherein said plurality of primaries comprises at least four primaries.

8. The method of claim 1, wherein said input data comprises CMYK print data.

9. The method of claim 1, wherein said image comprises an image to be printed.

10. A system for displaying at least a portion of an image, the system comprising:
    a controller to receive input data corresponding to at least a portion of said image;
    a pixilation device controlled by said controller to scale spots of said input data to correlate the spots to pixels of a display device and to produce a scaled image of said portion; and
    optical magnification device controlled by said controller to conform size of said scaled image of said portion by optical magnification to produce a displayed image of said portion, such that the displayed image of said portion has substantially the same size as the actual size of said portion.

11. The system of claim 10, wherein said controller is able to convert at least some of said input data into converted data of a lower pixel resolution.

12. The system of claim 11, wherein said controller is able to combine a first number of pixels of said input data into a second number of combined pixels, said second number is smaller than said first number.

13. The system of claim 10, wherein said magnification device comprises at least an optical zoom lens.

14. The system of claim 10, wherein said pixilation device comprises at least a spatial light modulator.

15. The system of claim 10 comprising a light source to apply light to said pixilation device, said controller is able to control said light source and said pixilation device based on at least some of said input data.

16. The system of claim 15, wherein said light source comprises at least a color wheel.

17. The system of claim 15, wherein said light source comprises at least four primary colors.

18. The system of claim 10, wherein said input data comprises color data, said controller is able to convert at least some of said color data into data corresponding to a plurality of primaries.

19. The system of claim 18, wherein said color data comprises ink data, said controller is able to convert said ink data into intermediate spectra, and said intermediate spectra into the data corresponding to said plurality of primaries.

20. The system of claim 18, wherein said plurality of primaries comprises at least four primaries.

21. The system of claim 10 comprising a screen to display a magnified pixilated light pattern resulting from said optical magnification.

22. The system of claim 10, wherein said input data comprises CMYK data.

23. The system of claim 10, wherein said image comprises an image to be printed.

* * * * *